Patented Jan. 2, 1923.

1,440,455

UNITED STATES PATENT OFFICE.

WILLIAM E. GARDNER, OF PITTSBURGH, PENNSYLVANIA.

VULCANIZABLE COMPOSITION AND METHOD OF MAKING THE SAME.

No Drawing.   Application filed August 1, 1921.  Serial No. 489,068.

*To all whom it may concern:*

Be it known that I, WILLIAM E. GARDNER, a citizen of the United States, residing at Pittsburgh, in the county of Allegheny and State of Pennsylvania, have invented a certain new and useful Improvement in Vulcanizable Compositions and Methods of Making the Same, of which the following is a full, clear, and exact description, reference being had to the accompanying drawings.

This invention is a vulcanizable composition and the method of making the same.

The object of the invention is to produce a vulcanizable composition which shall be cheap and easily produced, one which will be waterproof, heat and acid resisting, not affected by oils or hydrocarbon solvents, and one which can be vulcanized to any degree of hardness or softness; and another object of the invention is to produce a composition which shall be an insulator and also capable of being molded or fabricated in various ways, and one from which a multiplicity of articles can be made.

With these objects in view the invention consists in the combination of ingredients hereinafter set forth, combined in substantially the proportions specified and in accordance with the method described.

In producing a composition in accordance with my invention, I employ a binder of rubber, preferably commercial rubber, and to the extent of twenty-five parts by weight. This rubber I break down preferably by rolling between rolls until it approaches the consistency of thick molasses.

I then incorporate with this rubber binder —thus prepared, the other ingredients of the composition and which have been thoroughly commingled, these commingled ingredients being incorporated by sifting instalments upon the rubber and working the same into thorough communion with the rubber binder, and the composition thus formed is then removed from the rolls and is ready for placing in the molds for vulcanizing.

The ingredients which are intimately commingled for incorporation with the binder are as follows: very fine Tripoli or its chemical or geological equivalent—sixty parts by weight. Sized mica (that is finely divided mica thoroughly combined with finely divided animal glue)—five parts by weight. Hydrated lime—two parts by weight and sulphur (in finely divided form, flour)—eight parts by weight. All of these ingredients are employed in the most finely divided form in which it is possible to obtain them, and in substantially the proportions set forth, and they are most intimately commingled in any suitable mixing apparatus.

After these various finely divided ingredients have been thus thoroughly combined, the mixture is applied in instalments to the rubber upon the breaking rolls and thoroughly incorporated by working the same into the rubber, this being accomplished by continuing the motion of the rolls, and building up or rolling on the completed composition which will be in the form of a soft sheet rolled about the roll.

This soft sheet can be cut and removed from the roll and it is then ready to be placed in the mold for vulcanizing.

The composition thus made can be vulcanized to any degree of hardness or softness, dependent upon the length of time to which the composition is subjected to the vulcanizing heat, and the vulcanizing can be done in either the open steam vulcanizer or in the heated press.

The composition composed of these ingredients and made according to this method I find to be waterproof and not affected by acids, oils or hydrocarbon solvents. It is also an excellent insulator, of both heat and electricity and inasmuch as it can be made any degree of hardness or softness, according to the period of vulcanization, it is obvious that it can be employed for a multiplicity of articles.

Having thus described my invention, what I claim is:

1. A composition of the kind described consisting of not more than twenty-five parts by weight of rubber, at least sixty parts by weight of a siliceous earth, five parts by weight of sized mica, two parts of hydrated lime and eight parts by weight of sulphur.

2. A composition of the kind described comprising at least sixty parts by weight of a siliceous earth of the Tripoli type, five parts by weight of mica and animal glue combined, two parts by weight of hydrated lime, and eight parts by weight of sulphur, said ingredients being intimately commingled and combined with not more than twenty-five parts by weight of a suitable binder.

3. A composition of the kind described comprising at least sixty parts by weight of Tripoli, five parts by weight of glue sized mica, two parts by weight of hydrated lime, and eight parts by weight of sulphur, all mixed together and incorporated with twenty-five parts of rubber.

In testimony whereof, I hereunto affix my signature.

WILLIAM E. GARDNER.